United States Patent Office 2,872,204
Patented Feb. 3, 1959

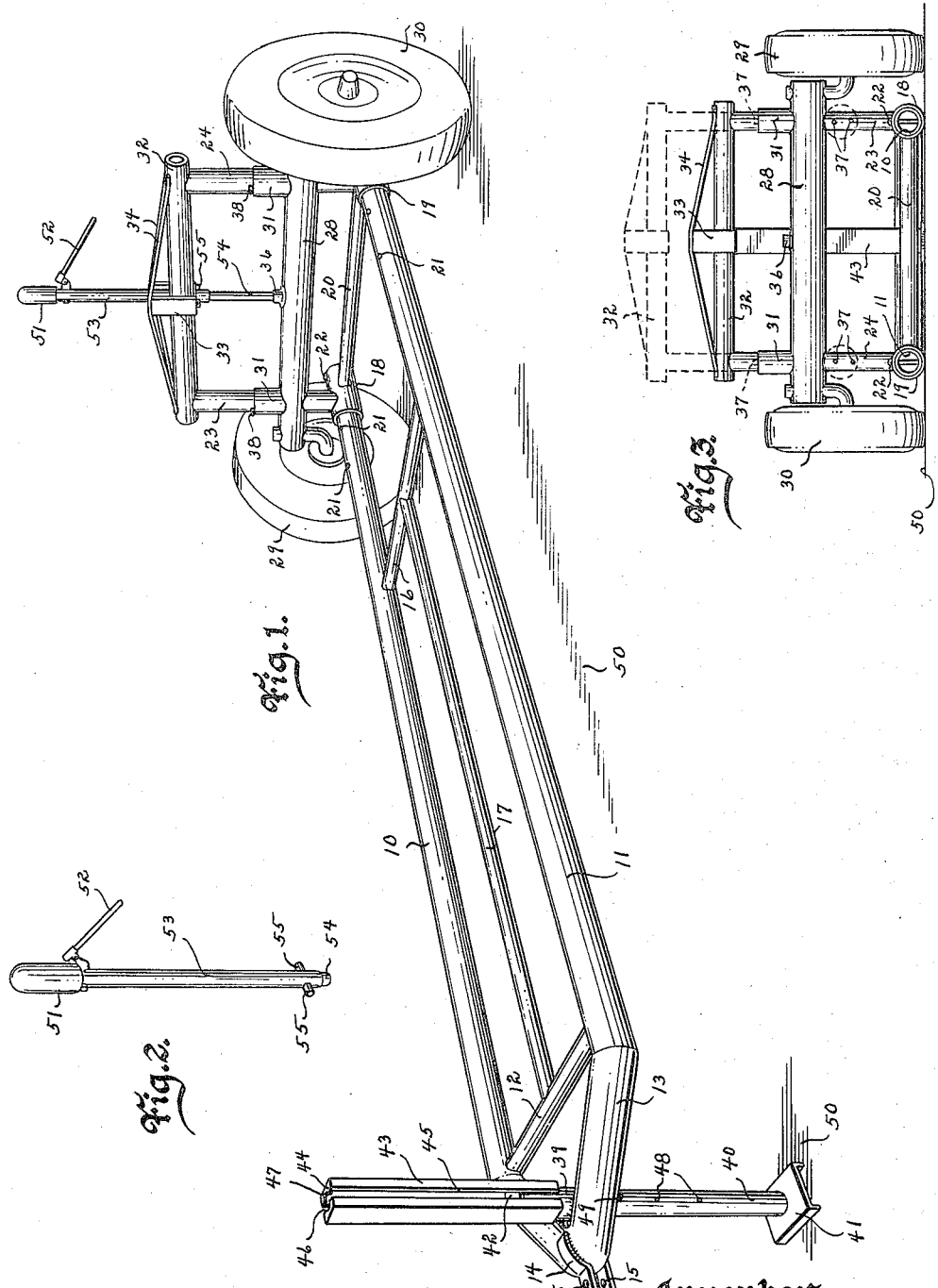

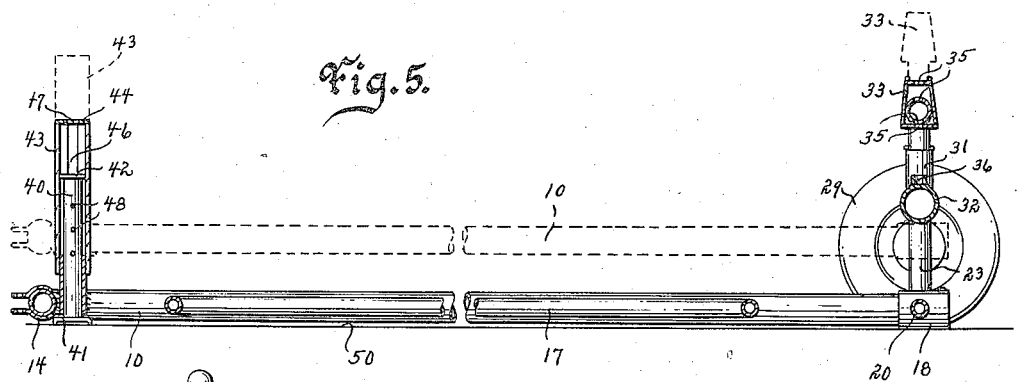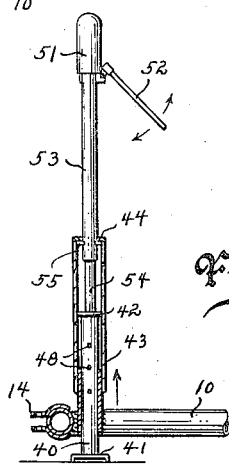

2,872,204

IMPLEMENT TRANSPORT HAVING A VERTICAL ADJUSTABLE CHASSIS

Bernard L. Blubaugh, Medford, Okla.

Application December 5, 1956, Serial No. 626,525

11 Claims. (Cl. 280—44)

This invention relates to a means for transporting implements and the like and, more particularly, to one that may be lowered to a ground position for receiving driven or pulled on wheeled farm equipment.

The transporting of machinery, and especially farm equipment, has become a serious problem.

Due to mechanized farming, an individual may now farm several places, and these places are often separated, thereby necessitating the movement of farm equipment over the available road net. Often the farm equipment is not capable of rapid movement on the road or highway. Furthermore, some equipment such as discs, harrows, and like, are most damaging to the road surface. It is for these reasons that much effort has been put forth in recent times to facilitate equipment transportation. The usual method has been to drive a wheeled frame over the object to be transported, and then elevate the object onto the frame. The chief objection to this method is that seldom will one wheeled frame accommodate more than one type of equipment.

Therefore, one of the principal objects of my invention is to provide an equipment transporting means that has its carriage lowerable to a ground position where the equipment to be transported is pulled or pushed onto it.

A further object of this invention is to provide a transport trailer that has a lowerable carriage platform capable of having either of its ends raised by jack means.

A still further object of my invention is to provide an implement transporting means that will receive or discharge an implement from either side direction.

A still further object of my invention is to provide a vertically adjustable implement transporting means for use in conjunction with a tractor or like that requires only two supporting wheels.

A still further object of my invention is to provide transporting means for equipment that is constructed chiefly of cylindrical tubing.

Still further objects of this invention are to provide a trailer transporting means that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device in elevated condition,

Fig. 2 is a perspective view of a jack lifting means,

Fig. 3 is a rear end view of my equipment transporting means showing its platform in lowered condition, Fig. 4 is a top plan view of my equipment transport with sections cut away to conserve space, Fig. 5 is a longitudinal sectional view of the device taken on line 5—5 of Fig. 4, and more fully illustrates its construction, and Fig. 6 is a side sectional view of the front end portion of the transport illustrating the manner of raising the same by an auxiliary jack.

While I have indicated the use of my device as especially adapted for the transportation of farm equipment over roads and highways, obviously it not only can be used for transporting farm equipment through gates, narrow passageways, and like, but also for moving farm equipment from one field to the other, or for moving the equipment from its storage area to point of use in a field. Also, my device can be used successfully for transporting non-farm objects.

Referring to the drawings, the platform per se is constructed of cylindrical tubing or pipes. The numerals 10 and 11 designate two spaced apart elongated horizontal side beams. These two beams are connected at their forward ends by a horizontal tube or pipe 12. The numeral 13 designates a continuation of the forward ends of the members 10 and 11 and which extend forwardly and inwardly to provide a pointed forward end tongue portion. On the forward end area of the portion 13 is a clevis 14 for embracing the drawbar or like of a pulling vehicle such as a tractor. (Not shown.) The numeral 15 designates the usual holes in the clevis for receiving the drawbar pin. The numeral 16 designates a tubular cross brace between the beams 10 and 11 and located a substantial distance forward of the rear ends of the beams 10 and 11, as shown in Fig. 1. The numeral 17 designates an elongated pipe connecting the central area of the element 12 with the central area of the element 16. The numeral 18 designates a sleeve slidably mounted on the rear portion of the beam 10. The numeral 19 designates a similar sleeve slidably mounted on the rear end portion of the beam 11. The numeral 20 designates a tubular cross member connecting the sleeve 18 with the sleeve 19. The numeral 21 designates vertical holes through the sleeves 18 and 19 and through the tubular beams 10 and 11. The numeral 22 designates pins for selectively extending through the holes 21 for adjustably securing the sleeves 18 and 19 against sliding action on the beams 10 and 11. Extending vertically upwardly from the sleeve 18 is a tube shaft 23. A similar tube shaft 24 extends upwardly from the sleeve 19. These parts just described in detail make up the major portion of the platform phase of my invention.

The numeral 28 designates an axle means, the central portion of which, at least, is of tubular construction. Rotatably mounted on the two ends of this axle means are two supporting wheels 29 and 30, as shown in Fig. 3. The posts 23 and 24 extend slidably upwardly toward the central tubular section of axle 28, as shown in Fig. 1. The numeral 31 designates a stub supporting sleeve embracing each of the posts 23 and 24 and connected to the upper side of the axle 28. These sleeves 31 aid the axle means in maintaining the posts 23 and 24 in upright sliding action with the axle. The numeral 32 designates a tubular crossbar connecting the upper ends of the posts 23 and 24 and which extends parallel horizontally in spaced relationship above the axle 28. The numeral 33 designates a box element secured around the central area of the crossbar 32. This box element 33 extends above the horizontal plane of the crossbar tube 32 and has braces 34 extending from its top downwardly and outwardly in both directions to the cross member 32, as shown in Fig. 3. The numeral 35 designates a vertical passageway or holes through the top, through the cross member 32 and through the bottom of the box portion 33, as shown in Fig. 5. The numeral 36 designates a well socket secured on the center top of the axle 28 and in a plane directly below the passageway or holes 35. The elements 18, 19, 20, 23, 24 and 32 are constructed of cylindrical tubing and may be considered as a frame means on the rear of the platform that is vertically slidable relative to the axle 28.

The numeral 37 designates one or more holes in each of the posts 23 and 24. These holes are adapted to selectively detachably receive holding pins, bolts, or like, 38, for preventing the downward sliding movement of the posts 23 and 24 through the axle 28 at times. The numeral 39 designates a vertical cylinder secured to the inside forward end of the tongue portion 13, as shown in Fig. 1. The lower end of this cylinder 39 is substantially that of the lower plane of the platform. The numeral 40 designates a shaft slidably mounted through the cylinder 39. The numeral 41 designates a foot on the lower end of the shaft 40 and the numeral 42 designates a head on its upper end. The numeral 43 designates a vertical elongated housing having its lower end portion embracing and secured to the cylinder 39. This housing 43 slidably embraces the head 42 and is preferably rectangular in cross section. The numeral 44 designates a top on the elongated housing 43 and the numerals 45 and 46 designate diametrically opposed slots in its sidewalls. The numeral 47 designates a hole in the top 44 and communicating with both of the slots 45 and 46, as shown in Fig. 4. The numeral 48 designates holes in the shaft 40 for detachably receiving the holding pin, or like, 49.

Obviously, if the shaft 40 is moved downwardly relative to the cylinder 39 and its foot 41 is in contact with a supporting surface, such as the ground, or like, 50, the forward end of the platform will be accordingly elevated. Likewise, if the distance between the axle 28 and cross element 32 is increased, the rear end of the platform will be elevated. Any suitable means, such as a manual jack, a hydraulic jack, or a lever means, may be used to actuate the shaft 40, or to increase the distance between the cross element 32 and axle 28. For most purposes, I recommend the use of an ordinary hand operated jack, generally designated by the numeral 51 and having the actuating handle 52, cylinder 53 and piston 54. The only modification of such a jack to meet the purposes required is the installation of two diametrically extending lugs 55 on the lower end portion of its cylinder 53, as shown in Fig. 2. Such a jack can be used for controlling the lowering of the platform or the raising of the platform relative to the ground surface. Assuming that the platform is resting on the ground surface, as shown in Fig. 1, and the object to be transported has been moved onto the platform, it is a simple procedure to raise the platform with its load for transportation purposes. This may be accomplished with a single jack by raising first one end of the device and then the other end. In raising the rear end of the platform, the jack is inserted downwardly through the passageway or holes 35, and then rotated one quarter of a turn to bring its lugs 55 under the box portion 33. With the lower end of the piston 54 of the jack in the socket 36 located on the axle 28, the actuation of the jack 51 will cause the piston 54 to move from the jack cylinder 53, thereby moving the cross member 32 away from the axle 28. This action will raise the posts 23 and 24, thereby elevating the rear end of the platform. After the posts 23 and 24 have been elevated, the pin 38 is extended through a hole 37 in each of the posts 23 and 24. These pins will extend through the posts and above the sleeves 31, thereby preventing the downward movement of the posts 23 and 24 from their elevated positions. At this time, the jack means is removed and inserted into the member 43 through its top hole 47. The jack is then rotated one quarter of a revolution to bring its lugs 55 under the top 44. By actuating the jack handle, the jack shaft 54 will be moved downwardly, contacting the head 42, forcing the shaft 40 downwardly, and thus raising the front end of the platform. If desired, a pin or bolt means 49 may be placed through a hole 48 in the shaft 40 below the cylinder bearing 39 for limiting the upward sliding movement of the shaft 40 relative to the member 39.

At this time, the jack may be removed. After the forward end of the device has been secured to a pulling tractor, truck or like, the pin 49 is removed and the member 40 elevated within the cylinder bearing 39. To maintain the support 40 in such an elevated condition during transportation, the pin 49 is placed through one of the holes 48 that is just above the cylinder bearing 39. After arriving at the unloading area, the jack may be placed for slightly raising the crossbar 32, the pins 38 removed, and by regulating the jack the rear end of the platform is gradually lowered under controlled conditions. The jack may then be removed and placed on the front end of the device, first to permit the withdrawal of the pin means 49, and to then lower the front end of the platform under control.

While I have described my device of the two-wheel type, it may be desirable for certain useages to have a four-wheel trailer and, when such is the case, the structure of the rear end of my device shown is duplicated at the front end.

Some changes may be made in the construction and arrangement of my implement transport without departing from the real spirit and purpose of my invention, and it is my intention to cover by my claims, any modified forms of structure or use of mechanical equivalents which may be reasonably included within their scope.

I claim:

1. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, and a shaft slidably mounted in said vertical elongated housing and capable of extending downwardly therefrom.

2. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, a shaft slidably mounted in said vertical elongated housing and capable of extending downwardly therefrom, and a means for detachably locking said shaft in various positions of its sliding movement relative to said vertical elongated housing.

3. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a socket on said axle means adapted to receive the lower end of said piston of said jack, a vertical elongated housing secured on the forward end of said platform, having an irregular hole passageway in its top and adapted to selectively receive said jack, and a shaft slidably mounted in said vertical elongated housing and capable of extending downwardly therefrom.

4. In a transporting vehicle, an elongated horizontal platform having two rearwardly extending beams, a sleeve slidably embracing each of said rearwardly extending beams, said sleeves and said beams having holes, a detachable pin means extending through the hole of each of said sleeves and selectively through a hole in the embraced beam, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, and a shaft slidably mounted in said vertical elongated housing and capable of extending downwardly therefrom.

5. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means; said posts each having a transverse hole, a pin detachably extending into each of said holes and positioned above said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, and a shaft slidably mounted in said vertical elongated housing and capable of extending downwardly therefrom.

6. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, a shaft slidably mounted in said vertical elongated housing and capable of extending downwardly therefrom, and a stub cylinder slidably embracing each of said posts and secured to said axle means.

7. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, a vertical elongated housing secured on the forward end of said platform, having an irregular hole passageway in its top and adapted to selectively receive said jack, a shaft slidably mounted in said vertical elongated housing and capable of extending downwardly therefrom, and a stub cylinder slidably embracing each of said posts and secured to the top of said axle means.

8. In a transporting vehicle, an elongated horizontal platform having two rearwardly extending beams, a sleeve embracing each of said rearwardly extending beams, a cross brace connecting the two sleeves, an axle means having a wheel rotatably mounted on each of its end portions, a vertical post secured to each of said sleeves and slidably extending upwardly through said axle means, a crossbar connecting the upper ends of said posts and having a vertical hole passageway, a jack detachably extending through said passageway having a cylinder, lug means on the cylinder, and a downwardly extending piston, a vertical elongated housing secured on the forward end of said platform, having a hole passageway in its top and adapted to selectively receive said jack, and a shaft slidably mounted in said vertical elongated housing and capable of extending downwardly therefrom.

9. In a transporting vehicle, an elongated horizontal platform having two rearwardly extending beams, a sleeve embracing each of said rearwardly extending beams, a bross brace connecting the two sleeves, an axle means having a wheel rotatably mounted on each of its end portions, a vertical post secured to each of said sleeves and slidably extending upwardly through said axle means, a crossbar connecting the upper ends of said posts and having a vertical hole passageway, a jack detachably extending through said passageway having a cylinder, lug means on the cylinder, and a downwardly extending piston, a vertical elongated housing secured on the forward end of said platform, having a hole passageway in its top and adapted to selectively receive said jack, a shaft slidably mounted in said vertical elongated housing and capable of extending downwardly therefrom, and a means for detachably locking said shaft in various positions of its sliding movement relative to said vertical elongated housing.

10. In a transporting vehicle, an elongated horizontal platform having two rearwardly extending beams, a sleeve embracing each of said rearwardly extending beams, a cross brace connecting the two sleeves, and axle means having a wheel rotatably mounted on each of its end portions, a vertical post secured to each of said sleeves and slidably extending upwardly through said axle means, a crossbar connecting the upper ends of said posts and having an irregular vertical hole passageway, a jack detachably extending through said passageway having a cylinder, lug means on the cylinder, and a downwardly extending piston, and a socket on said axle means adapted to receive the lower end of said piston of said jack.

11. In a transporting vehicle, an elongated horizontal platform having two rearwardly extending beams, a sleeve embracing each of said rearwardly extending beams, a cross brace connecting the two sleeves, and axle means having a wheel rotatably mounted on each of its end portions, a vertical post secured to each of said sleeves and slidably extending upwardly through said axle means, a crossbar connecting the upper ends of said posts and having a vertical hole passageway, a jack detachably extending through said passageway having a cylinder, lug means on the cylinder, and a downwardly extending piston, and a socket on said axle means adapted to receive the lower end of said piston of said jack.

References Cited in the file of this patent

UNITED STATES PATENTS

| | | |
|---|---|---|
| 1,005,979 | Kalbaugh | Oct. 17, 1911 |
| 1,853,837 | Trott | Apr. 2, 1932 |
| 2,487,508 | Anderson | Nov. 8, 1949 |
| 2,545,440 | Barber | Mar. 20, 1951 |
| 2,745,674 | Struble | May 15, 1956 |